United States Patent [19]
Tanaka et al.

[11] 3,969,727
[45] July 13, 1976

[54] POSITION DETECTING DEVICE FOR OMEGA RECEIVING SYSTEM

[75] Inventors: Hideki Tanaka, Takatsuki; Kazutaka Ishida, Suita; Minoru Handa, Ikoma; Asao Kitabatake, Kakogawa, all of Japan

[73] Assignee: Furuno Electric Company, Limited, Japan

[22] Filed: Sept. 9, 1974

[21] Appl. No.: 504,133

[30] Foreign Application Priority Data
Oct. 29, 1973 Japan............................ 48-121498

[52] U.S. Cl............................................ 343/105 R
[51] Int. Cl.² ........................................ G01S 1/30
[58] Field of Search ................................ 343/105 R

[56] References Cited
UNITED STATES PATENTS

3,209,356  9/1965  Smith........................... 343/105 R
3,493,971  2/1970  Earp............................. 343/105 R

*Primary Examiner*—Malcolm F. Hubler
*Assistant Examiner*—T. M. Blum
*Attorney, Agent, or Firm*—Eugene E. Geoffrey, Jr.

[57] ABSTRACT

Position detecting device for use with omega navigating apparatus which includes a receiver for receiving two omega signals from different stations, a synchronous generator for producing first and second signals synchronized with the omega signals and frequency dividing the synchronized signals by a common divisor to produce first and second frequency-divided waves, frequency dividing means for dividing the phase difference between the frequency-divided waves by the period of the omega signals to produce an integral quotient which constitutes a lane number while the remainder represents the phase difference between the first and second omega signals.

5 Claims, 9 Drawing Figures

POSITION DETECTING DEVICE FOR OMEGA RECEIVING SYSTEM

This invention relates to a novel and improved device for detecting the position of a navigating body, such as a ship, from the omega signals received by an omega receiver.

According to the omega navigating method, the phase difference between a pair of omega signals from two omega transmitting stations is measured on the navigating body and the position of the body is determined by the use of an omega chart. However, the position corresponding to a specific phase difference appears repeatedly at distances equal to one half wavelength of the omega signal, for example, about 15 kilometers at 10.2 KHz omega frequency, and the region included in this distance is called a "lane". Therefore, in order to determine precisely the position of the navigating body on the chart it is necessary to know both the lane in which the body is located, as well as the phase difference. Thus, the problem of position detection is reduced to the problem of lane detection.

According to the prior method of lane detection, when the navigating body is in a lane the number of which is known, for example, when it is in a port, this lane number, which is called "reference lane number", is recorded or memorized, and it is thereafter raised or reduced one by one each time the navigating body enters a new lane. However, in practicing this method, it is necessary to install a memory or recorder for storing the lane number, a device for measuring the phase difference constantly to detect a change of lane, a device for detecting the direction of variation of the phase difference, that is, increase or decrease, and effecting addition or subtraction of the lane number, and the like. Such devices are not only complicated and costly, but one also often affected by noises and erroneously operated due to poor noise immunity in the very low frequency omega signal.

Accordingly, an object of this invention is to provide an improved device for detecting the lane number based upon a novel principle, which is much simpler in construction but much more reliable in operation than prior devices.

According to a feature of this invention, the device comprises means for receiving first and second omega signals from first and second omega transmitting stations and generating first and second synchronized signals of the first and second omega signals, means for frequency-dividing the first and second synchronized signals by a common divisor to produce first and second frequency-divided waves and means for dividing the phase difference between the first and second frequency-divided waves by the period of the omega signals and producing a resultant integral quotient as the lane number and the remainder as the phase difference between the first and second omega signals. The device also comprises reference lane loading means which operates to shift in phase the first frequency-divided wave with respect to the second frequency-divided wave until the phase difference therebetween becomes equal to the phase difference of the omega signals plus a specific time interval corresponding to the reference lane number. This reference lane loading operation may be effected preferably by interrupting production of the corresponding frequency-divided wave until the required phase difference is obtained.

In practice, at least two pairs of omega stations are selected for detecting the position of the navigating body and these pairs may be changed as occasion demands during the navigation. It is desirable to conserve the phase relation of the frequency-divided waves of the each pair for future use, but it may be disturbed by the reference lane loading operation of the other pairs.

Accordingly, another object of this invention is to provide improved means for utilizing the reference lane with any pair of stations without any interference with the phase relation of the frequency-divided waves of any other pair.

According to another feature of this invention, the device further comprises means for receiving a third omega signal from a third omega transmitting station and generating a third sysnchronized signal of the third omega signal, means for frequency-dividing the third synchronized signal by a common divisor to produce a third frequency-divided wave and means for shifting in phase the third frequency-divided wave with respect to the second frequency-divided wave in accordance with the phase shift of the first frequency-divided wave.

Other objects and features of this invention will be described in detail hereinunder with reference to the accompanying drawings.

In the drawings.

Throughout the drawings, like reference numerals and symbols are used to denote corresponding structural components and signal paths.

Figure 1:
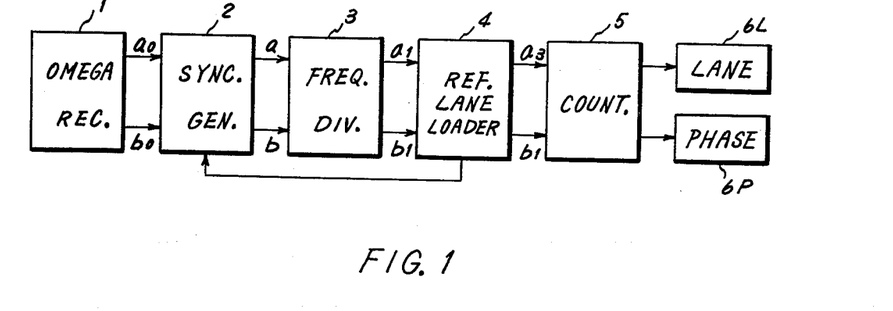
FIG. 1 is a schematic block diagram representing a basic configuration of the device according to this invention.

Referring first to FIG. 1, the basic configuration of this invention comprises an omega signal receiver 1, a synchronous signal generator 2, a frequency divider 3, a reference lane loader 4, a counter 5 and an indicator consisting of a lane indiator 6L and a phase difference indicator 6P. The operation of this device will be described with reference to the waveforms of FIG. 2.

Figure 2:
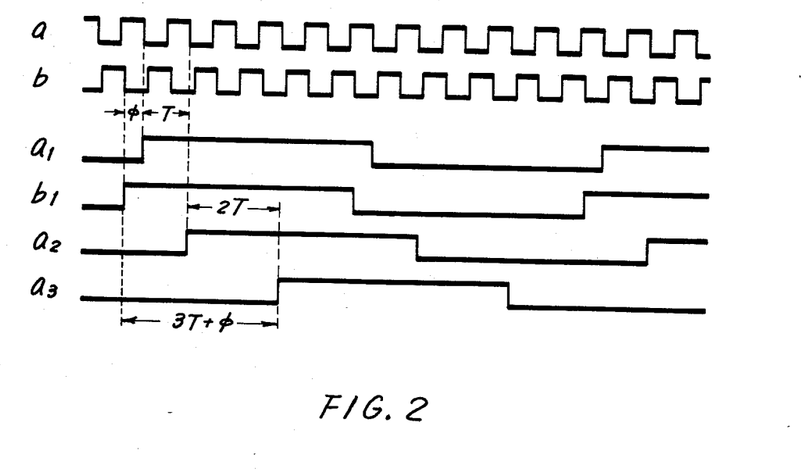
FIG. 2 is a waveform diagram presented as an aid for explaining the operation of the device of this invention.

The omega signal receiver 1 receives the omega signals from the omega transmitting stations and produces at least two omega signals from two stations, for example, signals $a_0$ and $b_0$ from Stations A and B, which have been specified previously. The signals $a_0$ and $b_0$ are fed to the synchronous signal generator 2 which generates a pair of signals $a$ and $b$ synchronized with the received omega signals $a_0$ and $b_0$ respectively. This may be done by comparing in phase a signal from an omega frequency oscillator with the received signals. Accordingly, the phase difference $\phi$ between the synchronous signals $a$ and $b$ is equal to the phase difference between the omega signals $a_0$ and $b_0$ and varies from O to T cyclicly when the navigating body moves, where T is defined as the period of omega signal. The navigating body enters in a new lane when the phase difference $\phi$ becomes either O or T.

The frequency divider 3 divides the frequencies of the synchronous signals $a$ and $b$ by a common divisor, e.g. 10 in the drawing, to produce a pair of frequency-divided waves $a_1$ and $b_1$. Although the variation of the phase difference $\phi$ of the synchronous signals $a$ and $b$ is limited within a range of O to T, the phase difference between the frequency-divided waves $a_1$ and $b_1$ varies over the entire range. For instance, when the navigating body moves across one lane, the phase of the signal $a_1$ is shifted by T with respect to the signal $b_1$ as shown by $a_2$ and the phase difference therebetween becomes $\phi + T$, though the phase difference of the signals $a$ and $b$ returns again to $\phi$. In general, the phase difference of the frequency-divided waves $a_1$ and $b_1$ will become $\phi + nT$, after the navigating body moves across $n$ lanes. This means that the integral quotient $n$ obtained by dividing the phase difference between the frequency-divided waves $a_1$ and $b_1$ by the period T of omega signal gives the number of lanes which have been traversed and the remainder $\phi$ gives the phase difference between the omega signals $a_0$ and $b_0$.

As the quotient $n$ is the number of lanes traversed, the lane number of the initial position, that is, the reference lane number, must be added thereto in order to obtain the practical lane number at that time. The reference lane loader 4 is provided therefor. It serves a function of shifting the phase of the frequency-divided wave $a_2$ with respect to the wave $b_1$ by a specified amount. For example, the reference lane loader 4 is arranged to shift the phase of the wave $a_2$ by 2T when the reference lane number is 2, thereby producing a frequency-divided wave $a_3$ having a phase difference $3T + \phi$. This phase difference is detected by the counter 5 and also divided by the period T and the resultant quotient 3 is indicated as the required lane number by the lane indicator 6L and the remainder $\phi$ is indicated as the required phase difference by the phase difference indicator 6P. The phase shifting operation of the reference lane loader 4 can be effected most conveniently by interrupting the operation of the synchronous signal generator 2 for a time related to the time of the signal $a$ only. This operation will be described in more detail later with reference to a specific embodiment.

Figure 3:
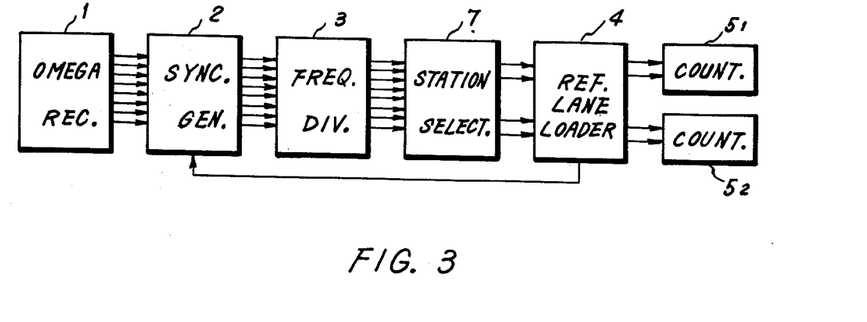
FIG. 3 is a schematic block diagram representing a variation of the device of FIG. 1.

As previously mentioned, the position of the navigating body is defined on a chart as an intersection of a pair of hyperbolic lanes, and at least two pairs of omega stations must be used for detecting the specific pair of lanes though one station of the each pair may be common. In order to avoid extra cost and unnecessary trouble for innstalling a pair of systems as shown in FIG. 1, a compact universal system receiver 1 is arranged to supply all omega signals received from eight omega transmitting stations A, B, C, . . . H and a synchronous signal generator 2 generates eight synchronous signals based upon the respective omega signals. The synchronous signals from the synchronous signal generator 2 are respectively frequency-divided by a common divisor in a frequency divider 3. A station selector 7 selects two pairs of waves corresponding to the specified two pairs of stations from the frequency-divided waves from the frequency-divider 3. The reference lane number of each pair of stations is applied by a reference lane loader 4 and the lane number and phase difference of the each pair are calculated by the counters $5_1$ or $5_2$ as described in conjunction with FIGS. 1 and 2.

As the phase difference between a pair of frequency-divided waves can not increase over their period, the divisor of the frequency dividing operation must be selected according to the maximum number of lanes provided between any pair of stations in practice, and it may be 1,800, for example.

Figure 4:
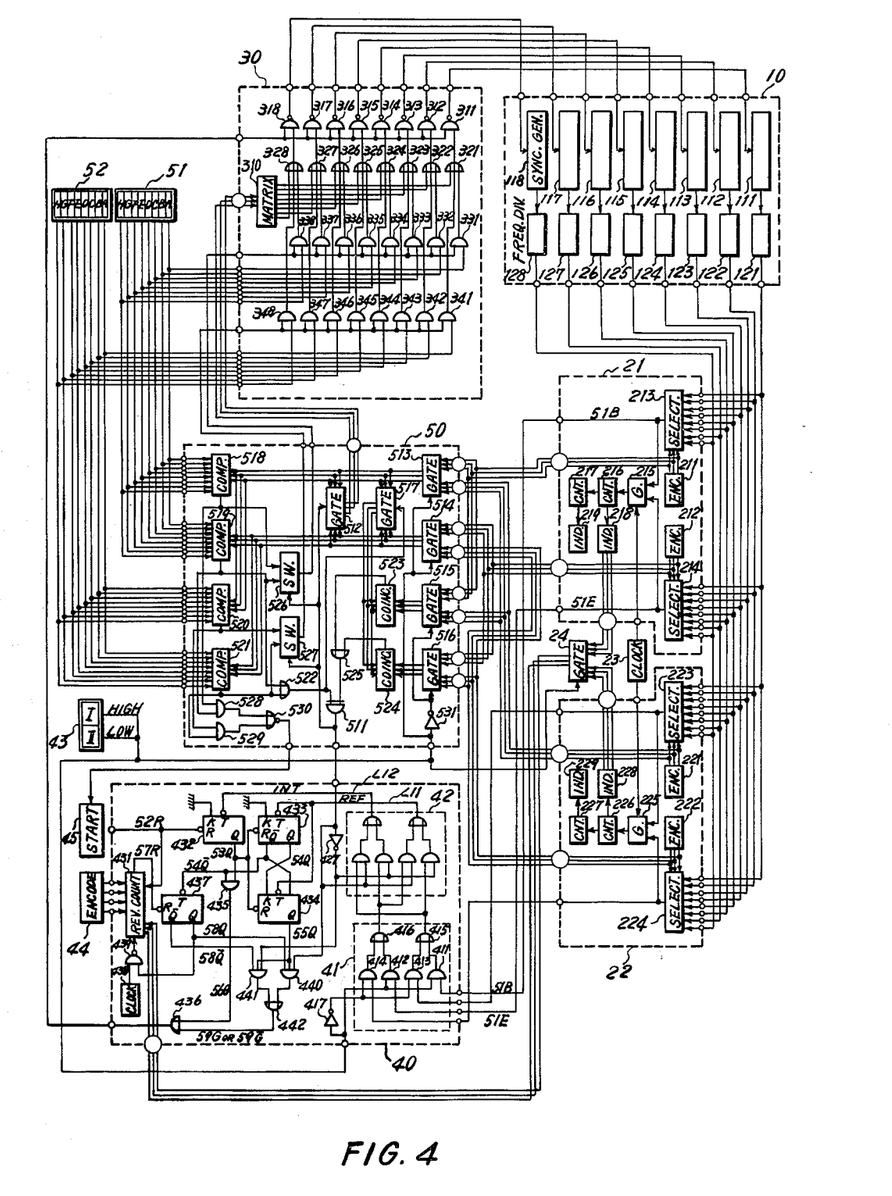
FIG. 4 is a circuit diagram representing an embodiment of the device of FIG. 3.

FIG. 4 represents a preferred embodiment of the device of FIG. 3, which includes an improved station selecting and reference lane loading system. The device comprises six major components shown in dashed blocks; a station signal generating section 10, first and second measuring sections 21 and 22, a control section 30, a control wave generating section 40 and a station switching section 50.

The station signal generating section 10 includes eight synchronous signal generator units 111, 112, . . . 118 and a corresponding number of frequency-divider units 121, 122, . . . 128. The synchronous signal generators 11 to 118 generate eight continuous signals synchronized respectively with the omega signals received from eight omega transmitting stations A, B, . . . H by an omega receiver unit (not shown), and the frequency-dividers 121 to 128 divide the frequencies of these continuous synchronized signals respectively by a common divisor, such as 1,800, to produce eight frequency-divided waves corresponding to the respective stations, which will be called "station signals" hereinunder.

The first and second measuring sections 21 and 22 are exactly same in current configuration and serve the function of selecting two pairs of station signals corresponding to the specified two pairs of transmitting stations out of the station signal outputs of the station signal generating section 10 and measuring and indicating the phase differences and lane numbers corresponding to the respective pairs. The first measuring section 21 includes main and auxiliary station encoders 211 and 212, main and auxiliary pair selectors 213 and 214, a gate circuit 215, phase and lane counters 216 and 217 and phase and lane indicators 218 and 219 and, similarly, the second measuring section 22 includes corresponding units 221, 222, 223, 224, 225, 226, 227, 228 and 229. Moreover, the both measuring sections 21 and 22 include a clock pulse generator 23 and a switching gate circuit 24.

In the case of measuring the lane and phase difference of a pair of stations, the stations are inserted in the main and auxiliary encoders 211 and 212 respectively in coded form by appropriate manually operated means such as push buttons. Exclusive codes, such as binary codes of three bits, are previously assigned to the eight stations A, B . . . H respectively and the main-auxiliary relationship of the stations is predetermined in the order of alphabet. Therefore, when Stations B and E are specified as the first pair for example, Station B is inserted in the main station encoder 211 and Station E is inserted in the auxiliary Station encoder 212, thereby the main and auxiliary station encoders 211 and 212 produce the codes of Stations B and E, respectively.

Figure 6:
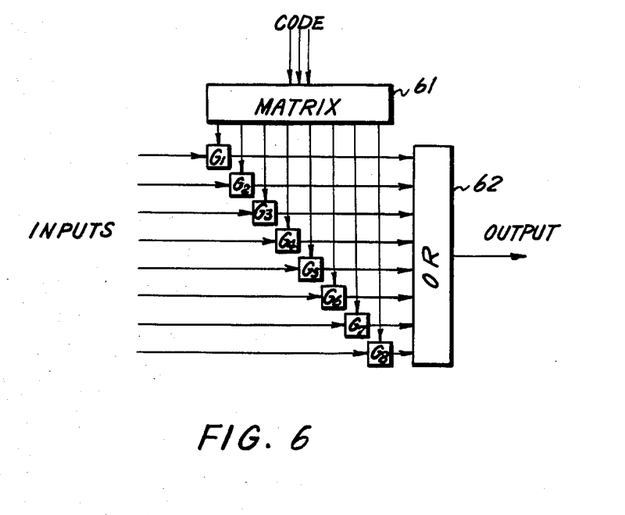
FIGS. 6, 7 and 8 are circuit diagrams representing various structural components of the circuit of FIG. 4.

FIG. 6 represents an embodiment of the circuit configuration of the selectors 213, 214, 223 and 224. This circuit consists of a matrix circuit 61, an OR circuit 62 and eight gate circuits G1, G2, . . . G8. The station signal inputs supplied by the eight frequency-dividers 121 to 128 of the station signal generating section 10 are respectively applied through the gate circuit G1 to G8 to the OR circuit 62, and the station code is applied to the matrix circuit 61 from the each station encoder. According to the station code input, the matrix circuit 61 applies its output to a corresponding gate circuit to cause the corresponding station signal to pass therethrough and to be fed from the OR circuit 62 as the output signal of the selector.

Figure 5:
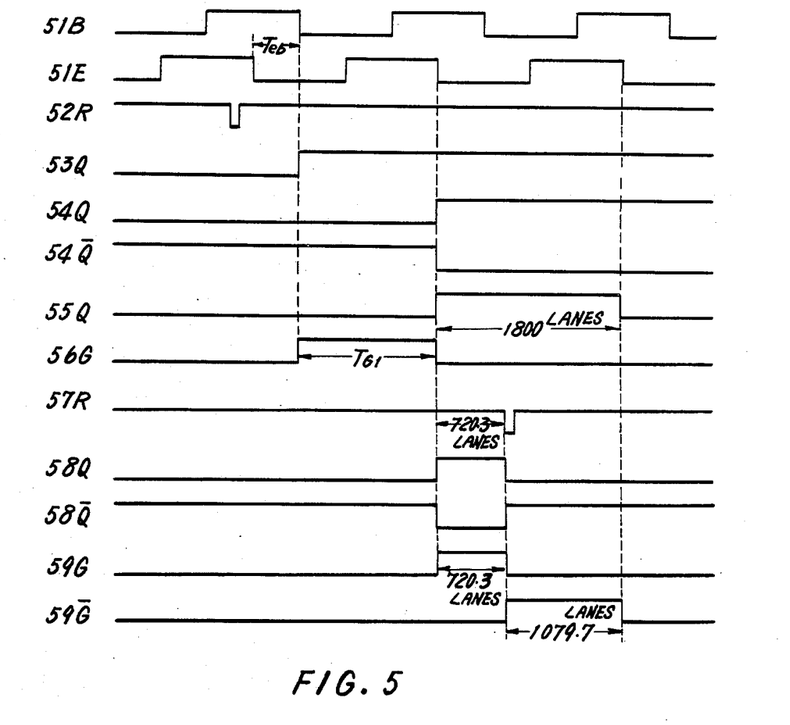
FIG. 5 is a waveform diagram presented as an aid for explaining the operation of the device of FIG. 4.

Assuming now that Stations B and E are selected as the first pair, the selectors 213 and 214 produce the station signals 51B and 51E of Stations B and E respectively as their outputs (See, FIG. 5). The signals 51B and 51E are applied to the gate circuit 215 to cause it to pass the clock pulses from the clock pulse generator 23 to the phase counter 216 only for a time interval corresponding to the phase difference $T_{eb}$ between the both signals. The clock pulse frequency is previously fixed at 100 times the omega frequency and the counter 216 is arranged to produce an output at every 100 counts, consequently, at every lane. Therefore, the count of the lane counter 217, which is indicated by the lane indicator 219, represents the lane number and the remainder in the counter 216, which is indicated by the phase indicator 218, represents the phase difference in centilane. This phase difference is further supplied in coded form through the switching gate circuit 24 to the control wave generating section 40. The operation of the second measuring section 22 is essentially same as the above.

As previously described, the phase difference $T_{eb}$ must include the "reference lane number" in order to effect complete lane indication. Lane loading operation for adding a further phase shift corresponding to the reference lane number of the phase difference between the both station signals is effected in this embodiment by interrupting the operation of the synchronous signal generator in the station signal generating section 10, which belongs to either of the selected stations, for a time interval corresponding to the reference lane number. For this purpose, the control wave generating section 40 produces a control wave for interrupting the synchronous signal generator for a proper time interval and the station switching section 50 discriminates the station whose synchronous signal generator is to be interrupted. The control section 30 executes the interrupting operation under control of these sections 40 and 50.

The control wave generating section 40 includes a first switching circuit 41 consisting of four AND gates 411, 412, 413 and 414 and two OR gates 415 and 416 and accompanied with a NOT gate 417, a second switching circuit 41 consisting of similar components and accompanied with a NOT gate 427, a reverse counter circuit 431, JK flip-flop circuits 432, 433 and 434, an AND gate 435, an OR gate 436, a JK flip-flop circuit 437, a clock pulse generator 438, a NAND gate 439, AND gates 440 and 441 and an OR gate 442, is accompanied with a change-over switch 43, a reference lane encoder 44 and a start switch 45. These components are interconnected as shown in the drawing.

The lane loading operation is first effected with respect to one pair of stations and then with respect to the other pair. This pair selection is manually effected by the change-over switch 43. When the button I of the switch 43 is pushed, the switch produces an output at high level and this high level output is applied to the AND gates 411 and 412 of the first switching circuit 41. As the station signal outputs 51B and 51E of the pair selectors 213 and 214 of the first measuring section 21 are also applied to the AND gates 411 and 412 respectively, the station signals of the first pair are fed from the first switching circuit 41 through the OR gates 415 and 416 to the second switching circuit 42. On the contrary, when the button II of the change-over switch 43 is pushed, the switch produces an output at low level and, due to a function of the NOT gate 417, a high level signal is applied to the AND gates 413 and 414. Therefore, the station signals of the second pair are supplied from the first switching circuit 41 to the second switching circuit 42.

In the lane operation, either the synchronous signal generator of the main station or that of the auxiliary station must be interrupted. However, this selection must be effected so as not to interfere the lane loading operation for the other pair of stations. This selection is executed logically by the station switching section 50 and designated by the output level of an exclusive OR gate 511 of the section 50. It should be easily understood by those skilled in the art that the auxiliary station signal is fed from the second switching circuit 41 through a line $L_{11}$ and the main station signal is fed therefrom through line $L_{12}$ when the output of the exclusive OR gate is at a high level but the main station signal is fed through the line $L_{11}$ and the auxiliary station signal is fed through the line $L_{12}$ when it is at low level. As will be clarified later, the station corresponding to the signal fed through the line $L_{11}$ is a station whose synchronous signal generator is not to be interrupted and will be referred as "REF station" hereinunder, and the station corresponding to the signal fed through the line $L_{12}$ is a station whose synchronous signal generator is to be interrupted and will be referred as "INT station" hereinunder.

For example, when the first pair of stations is selected by the pair change-over switch 43 and the output of the exclusive OR gate 511 is at high level, the station signal 51E of Station E is fed through the line $L_{11}$ as the REF station signal and the station signal 51B of Station B is fed through the line $L_{12}$ as the INT station signal (FIG. 5).

Reference lane loading is effected through the reference lane encoder 44 by operating a key board manually for example. The reference lane number thus applied to the encoder 44 is supplied in a coded form to the reverse counter 431. The phase difference measured by the measuring section 21 or 22 is also supplied in a coded form through the switching gate citcuit 24 to the reverse counter 431. The reference lane number and the phase difference are simultaneously set in the reverse counter 431 in response to a start signal from the start switch 45 when it is actuated. Assuming that the reference lane number is 720 and the measured phase difference is 30 centilanes, a numerical value 72030 is stored in the reverse counter 431 in a coded form.

Figure 7:
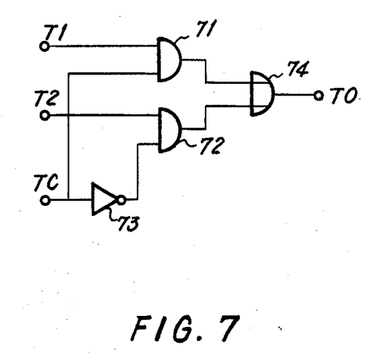

The switching gate circuit 24 has a configuration, as shown in FIG. 7 as an example, including two AND gates 71 and 72, a NOT gate 73 and an OR gate 74 interconnected between, three input terminals T1, T2 and TC and an output terminal TO. The terminals T1 and T2 are connected to the first and second measuring sections 21 and 22, the terminal TC is connected to the change-over switch 43 and the terminal TO is connected to the reverse counter 431. Obviously, the gate circuit 24 is operated under control of the output of the switch 43 to pass the phase difference from the first measuring section 21 with a high level output and from the second measuring section 22 with a low level output.

When the start switch 45 is actuated, a start signal such as waveform 52R (FIG. 5) is applied to the R-terminal of the JK flip-flop 432 to reset it. The flip-flop 432 is also supplied with the INT station signal 51B to its T-terminal. As the K-terminal is grounded, the O-output of the flip-flop 432 is inverted by the trailing edge of the station signal 51B which appears first after the start signal 52R and left as it is, as shown by waveform 53O in FIG. 5. The JK flip-flops 433 and 434 whose R-terminals are connected to the O-terminal of the flip-flop 432 start operation with the inversion of the Q-output 53Q of the flip-flop 432. As the K-terminal of the flip-flop 433 is grounded, the Q-output thereof is inverted by the trailing edge of the REF station signal 51E applied through the line $L_{11}$ to its T-terminal, which appears first after the inversion of the Q-output 53Q of the flip-flop 432, as shown by waveform 54Q in FIG. 5. Accordingly, the $\overline{Q}$-output of the flip-flop 433 appears as shown by waveform 54$\overline{Q}$ in FIG. 5. Although the Q-output of the flip-flop 434 is inverted at the same time as the Q-output of the flip-flop 433 as the REF station signal 51E is also connected to the T-terminal of the flip-flop 434, it is restored by the next trailing edge of the signal 41E as the Q and $\overline{Q}$ outputs of the flip-flop 433 are connected respectively to the K and J terminals of the flip-flop 434. In other words, the Q-output of the flip-flop 434 inverted for a time equal to one period of the station signal which corresponds to 1,800 lanes when the frequency-division ratio is 1/1,800, as shown by waveform 55Q in FIG. 5.

The Q-output 53Q of the flip-flop 434 and the $\overline{Q}$-output 54$\overline{Q}$ of the flip-flop 433 are applied to the AND gate 435 and, consequently, the AND gate 435 produces an output having a duration from the trailing edge of the station signal 51B to the trailing edge of the station signal 51E which appears just after the former trailing edge, as shown by waveform 56G in FIG. 5. This waveform 56G is applied through the OR gate 436 to one input of each of the NAND gates 311, 312, . . . 318 of the control section 30, respectively. When Station B is elected as the INT station, a code signal representing Station B is supplied from a switching gate circuit 512 of the station switching section 50 to a matrix circuit 310 and the circuit 30 supplies a high level signal through an OR gate 322 to the NAND gate 312 corresponding to Station B. Consequently, the inversion of the waveform 56G is applied from the NAND gate 312 to the synchronous signal generator 112 to interrupt its operation for the duration $T_{GI}$ of the signal 56G. As the signal 56G is maintained from the trailing edge of the station signal 51B to the trailing edge of the station signal 51E, the phase of the station wave 51B is caused to coincide with that of the station wave 51E.

Again, in the control wave generating section 40, as the $\overline{Q}$-terminal of the JK flip-flop 433 is also connected to the T-terminal of the JK flip-flop 437, the Q and $\overline{Q}$ outputs of the flip-flop 437 are inverted in response to the inversion of the flip-flop 433. However, it is again inverted to reset by a signal supplied from the reverse counter 431, to its R-terminal. When the Q-output of the flip-flop 437 is inverted into high level, it is applied to the NAND gate 439 with clock pulses from the clock pulse generator 438 to pass the clock pulses therethrough toward the reverse counter 431. The reverse counter 431 counts the clock pulses and, when the count reaches the numerical value stored therein, it produces an output pulse which is applied to the R-terminal of the flip-flop 437. The clock pulse frequency of the clock pulse generator 438 is previously fixed at 100 times of the omega frequency in the same manner as the clock pulse generator 23. Accordingly, the reverse counter 431 produces the output pulse after counting out the number of centilanes stored therein. If the numerical value 72030 is stored as assumed above, the counter 431 produces an output after a time interval corresponding to 720.3 lanes from the inversion of the $\overline{Q}$-output 54$\overline{Q}$ of the flip-flop 433, as shown by waveform 57R in FIG. 5. As this output pulse is applied to the R-terminal of the flip-flop 437 to reset it, the Q and $\overline{Q}$ outputs of the flip-flop 437 appear as shown by waveforms 58Q and 58$\overline{Q}$ in FIG. 5. The Q and $\overline{Q}$ outputs of the flip-flop 437 are applied respectively to the AND gates 440 and 441 with the Q-output 55Q of the flip-flop 434.

The AND gates 440 and 441 are also controlled by the output of the exclusive OR gate 511 of the station switching section 50. It is understood that the OR gate 442 produces an output as shown by waveform 59G in FIG. 5 when the output of the exclusive OR gate 511 is at high level or an output as shown by waveform 59$\overline{G}$ when it is at low level. Thus, the waveform 59G or 59$\overline{G}$ is supplied through the OR gate 436 to the AND gates 311 to 318 of the control section 30.

When the numerical value 72030 is stored in the reverse counter 431, the duration of the signal 59G corresponds to 720.3 lanes. As the duration of the signal 55Q corresponds to one period of the station signal 51E which corresponds to 1,800 lanes in this embodiment as mentioned above, the duration of the signal 59$\overline{G}$ is 1,800 lanes minus 720.3 lanes equal to 1079.7 lanes.

As described above, a high level output is produced from the exclusive OR gate 511 of the station switching section 50 when Station B is selected as the INT station. Therefore, the signal 59G is forwarded from the AND gate 440 through the OR gates 442 and 436 to the control section 30. Thus, in a manner similar to the case of the signal 56G, the synchronous signal generator 112 of Station B is interrupted for a time corresponding to the duration of the signal 59G, that is, to 720.3 lanes. Consequently, the phase of the station signal 51B is delayed with respect to the phase of the station signal 51E by a time corresponding to 720.3 lanes. As a phase difference corresponding to 0.3 lane existis previously between the both signals 51B and 51E, this results in a completion of lane loading of desired 720 lanes.

As described above, in this embodiment, the phases of a pair of station signals are caused to coincide temporarily by the signal 56G after storing the phase difference therebetween in the reverse counter 431, and then the phase of one station signal is delayed with respect to the other by an amount corresponding to the reference lane number plus the phase difference, thereby restoring the original phase difference.

Contrarily, when Station E is selected as the INT station and a low caused output is produced by the exclusive OR gate 511, the signal 59$\overline{G}$ is supplied from the AND gate 441 to the control section 30. In this case, the switching gate circuit 512 of the station switching section 50 forwards the code of Station E to the matrix circuit 310 of the control section 30 and the matrix circuit 310 forwards a signal through the OR gate 325 to the NAND gate 315 which corresponds to Station E, thereby interrupting the synchronous signal generator 115 for a time corresponding to 1079.7 lanes. Thus, the phase of the station signal 51E is delayed by 1079.7 lanes with respect to the station signal 51B. It can be understood that this phase shift caused by the signal 59G is exactly equivalent to the phase shift cuased by the signal 59G in which the phase of the station signal 51B is delayed with respect to the station signal 51E by 720.3 lanes. Accordingly, the desired lane number can be loaded even when either of the stations is elected as the REF or INT station. However, that station which is to be elected as the REF or INT Station is discriminated by the station switching section 50, as previously suggested.

Figure 8:
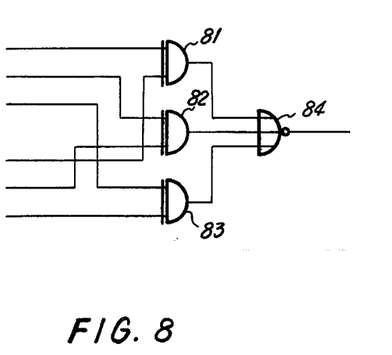

The station switching section 50 includes, in addition to the abovementioned exclusive OR gate 511, switching gate circuits 512, 513, 514, 515, 516 and 517 having a circuit configuration as shown in FIG. 7, comparator circuits 518, 519, 520 and 521 having a circuit configuration as shown in FIG. 6, an OR gate 522, coincidence circuits 523 and 524 having a circuit configuration as shown in FIG. 8, an OR gate 525, switching circuits 526 and 527, AND gates 528 and 529, a NOR gate 530 and a NOT gate 531, and accompanied by first and second lane locking switch boards 51 and 52. These components are interconnected as shown in the drawing.

Each of the lane locking switch boards 51 and 52 has eight key units corresponding to Stations A, B, . . . H respectively and each of the key units has its output line. When, the key unit or units are actuated manually, high level output or outputs appear on the corresponding output line or lines. The first and second switch boards 51 and 52 are originally provided in correspondence with the first and second pairs of stations, respectively. Therefore, if Stations B and E are selected as the first pair and Stations C and D are selected as the second pair, the key units of Stations B and E of the first switch boards 51 and the key units of Stations C and D of the second switch board 52 are actuated. However, if Stations B and E are selected as the first pair and Stations A and B are selected as the second pair, it is enough to actuate the key units of Stations A, B, and E of either the switch board 51 or the switch board 52.

Now, the operation of the station switching section 50 will be described in detail with reference to the flow chart of FIG. 9, as well as the circuit diagram of FIG. 4.

The switching gates 513 and 515 are supplied with the code signals of the main stations from the first and second measuring sections 21 and 22 and the switching gates 514 and 516 are supplied with the code signals of the auxiliary stations. These switching gates serve a function of electing either first or second pair under control of the signal from the change-over switch 43. As the gates are arranged to select the first pair with a high level control signal and the second pair with a low level signal, the gates 513 and 514 produce the main and auxiliary station codes of the first pair and the gates 515 and 516 produce those of the second pair when the button I of the switch 43 is pushed, and vice versa when the button II thereof is pushed.

Assuming now that the first pair of stations are selected by pushing the button I of the switch 43 and the main and auxiliary station codes are respectively forwarded by the gates 513 and 514, and that station which is to be selected as the INT station, the main station or the auxiliary station, must be decided. This selection must be done so that the temporaray interruption of the synchronous signal generator belonging to the present INT station may not interfere with the lane loading operation of the other pair. For this purpose, this is done in accordance with the following schedule.

The first inquiry is made about whether any lane loading operation has already been done in conjunction with the present auxiliary station. This step is shown by a block 91 in FIG. 9.

If "Yes", that is, if the auxiliary station has already had a relation to the preceding lane loading, the main station may be selected as the INT station. Therefore, the next inquiry is made as to whether the main station is also included in the other pair, in order to avoid interference with the other pair. This step is shown by a block 92 in FIG. 9. If the answer is "No", that is, if the main station has no relation to the other pair, the main station is to be selected as the INT station as shown by a block 93 of FIG. 9. However, if the answer is "Yes", that is, if the main station is also included in the other pair, the auxiliary station is to be elected as the INT station, notwithstanding the fact that it has already been connected to the preceding lane loading operation, as shown by a block 94 in FIG. 9.

Figure 9:
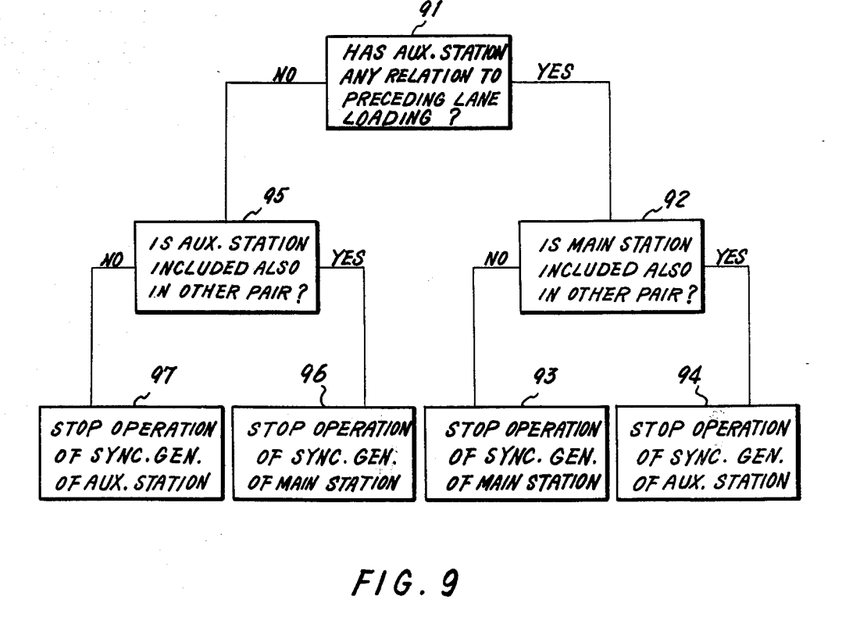
FIG. 9 is a flow chart presented as an aid for explaining the operation of the device of FIG. 4.

In the step 91, if the answer is "No", that is, if the auxiliary station has no relation to the preceding lane loading, the next inquiry is made about whether the auxiliary station is also included in the other pair, as shown by a block 95 in FIG. 9. And, if "Yes", that is, if the auxiliary station is also included in the other pair, the main station is to be selected as the INT station, as shown by a block 96 in FIG. 9. However, if "No", that is, if the auxiliary station has no relation to the other pair, the auxiliary station is selected as the INT station, as shown by a block 97.

The abovementioned schedule of operation is practiced by the section 50 as follows.

In operation of the step 91 above, the auxiliary station code is applied from the gate 514 to the comparison circuits 519 and 521. The respective eight output lines of the lane locking switch boards 51 and 52 are respectively connected to the circuits 519 and 521. Each of the circuits 519 and 521 has the same circuit configuration as shown in FIG. 6, and produces an output when the auxiliary station corresponding to the code signal supplied from the gate 514 coincides with the station loaded in the corresponding switch board 51 and 52. That is, if the auxiliary station has been loaded already by the lane locking switch board 51 or 52, the comparison circuit 519 or 521 produces a high level output and supplies it through the OR gate 522 to the switching gate circuit 517.

As the gate circuit 517 has the same circuit configuration as shown in FIG. 7, with the high level control input, the main station code passes therethrough the coincidence circuits 523 and 524. The coincidence circuits 523 and 524, in this case, are supplied with the main and auxiliary station codes of the other pair from the switching gate circuits 515 and 516, respectively. The coincidence circuits 523 and 524 have a circuit configurations as shown in FIG. 8, consisting of three exclusive OR gates 81, 82, and 83 and a NOR gate 84, and are arranged to produce a high level output when the both input codes of three bits coincide with each other. This comparing operation corresponds to the step 92 of FIG. 9.

When coincidence is confirmed by the circuit 523 or 524, that is, when the main station is also included in the other pair, the high level output thereof is applied through the OR gate 525 to the exclusive OR gate 511, together with the output of the OR gate 522. As a high level output is applied in this case from the OR gate 522 as stated above, the exclusive OR gate 511 produces a low level output when the input from the OR gate 525 is at high level. As a high level input is supplied from the OR gate 525 when the main station is included in the other pair, the exclusive OR gate 511 forwards a low level output to the switching gate circuit 512 having the same circuit configuration as shown in FIG. 7. Accordingly, the gate circuit 512 forwards the auxiliary station code to the matrix circuit 310 of the control section 30. Thus, the synchronous signal generator belonging to the auxiliary station is caused to stop operation. This step corresponds to the step 94 of FIG. 9. If no coincidence is obtained by the coincidence circuits 523 and 524, a high level signal is forwarded from the exclusive OR gate 511 to the gate 512 causing it to forward the main station code to the matrix circuit 310, thereby interrupting the synchronouos signal generator of the main station. This step is the step 93 of Flg. 9.

When no coincidence is obtained by the comparison circuits 519 and 521, that is, when the auxiliary station has had no relation to the preceding lane loading, their low level output is applied through the OR gate 522 to the gate circuit 517 to cause it to forward the auxiliary station code to the coincidence circuits 523 and 524. This step corresponds to the step 95 of FIG. 9.

If the coincidence is confirmed by the circuit 523 or 524, that is, if the auxiliary station is also in the other pair, the high level outut is through the OR gate 525 to the exclusive OR gate 511. As the other input from the OR gate 522 is low in this case, the exclusive OR gate forwards a high level output to the gate circuit 512 causing it to forward the main station code to the matrix circuit 310. This step is the step 96 of FIG. 9.

If no coincidence is obtained by the circuits 523 and 524, that is, the auxiliary station has no relation to the other pair, the exclusive OR gate 511 having two low level inputs forwards a low level output to the gate 512 to cause it to forward the auxiliary station code to the matrix 310. This step is the step 97 in FIG. 9.

The matrix circuit 310 of the control section 30 produces its output on one output line thereof which is connected to one of the OR gates 321, 322, . . . 328 which corresponds to the station code applied thereto from the switching gate 512. Therefore, the synchronous signal generator belonging to the station which is specified as the INT station by the station code output from the switching gate 512 is interrupted under control of the control signals 56G and 59G or $\overline{59G}$ supplied from the control wave generating section 40.

According to the present invention, not only the synchronous signal generator belonging to the INT station specified by the output of the gate 512, but also the synchronous signal generator belonging to the station which has already encountered a lane loading operation with the former INT station, can be interrupted under control of the same control signals 56G and 59G or $\overline{59G}$. With this operation, the lane loading operation of the second pair can be executed without interfering with the lane relationship of the first pair wherein the lane loading has already been completed. This operation is effected as follows.

For instance, when the main station code is forwarded from the swtiching gate 512 as the INT station code, if the station corresponding to this code has been loaded in the first lane locking switch board 51, the comparison circuit 518 produces a high level output and forwards it through the switching circuit 516 to one input of each of the AND gates 331, 332 . . . 338 of the control section 30, the other input of each of the AND gates being connected respectively to the eight output lines from the first lane locking switch board 51. Accordingly, the AND gates corresponding to the stations loaded in the switch board 51 are opened and forwards the high level output through the corresponding OR gates of 321 to 328 to the corresponding NAND gates of 311 to 318, thereby interrupting the corresponding synchronous signal generators of 111 to 118 at the same time.

When the main station has been loaded in the second lane locking switch board 52, the comparison circuit 520 forwards a high level output through the switching circuit 527 to one input of each of the AND gates 341, 342 . . . 348 of the control section 30, the other input of each of the AND being connected respectively to the eight output lines from the second lane locking switch board 52. Accordingly, in the same manner as the above, the synchronous signal generators belonging to the stations which have been loaded already in the second lane locking switch board 52 are interrupted.

On the other hand, when the auxiliary station code is forwarded from the switching gate circuit 512 as the INT station code, the coincidence outputs of the comparison circuits 519 and 521 are respectively forwarded through the switching circuits 526 and 527 to the control section 30 in the same manner as the above. In this case, therefore, the synchronous signal generators belong to the stations which have a lane relationship already settled with the auxiliary station are interrupted under control of the control signals 56G and 59G or $\overline{59G}$ supplied from the control wave generating section 40.

The switching operations of the switching circuits 526 and 527 are controlled by the output of the exclusive OR gate 511 such that the switching circuits 526 and 527 pass the outputs of the comparison circuits 518 and 520 respectively when the output of the exclusive OR gate is at high level but pass the outputs of the comparison circuits 519 and 521 when the output is at a low level. The switching circuits 526 and 527 may have a similar circuit configuration to that of FIG. 7.

While the reference lane of the each pair of stations may be loaded as described above, this device is also arranged such that lane loading operation is inhibited to such pair of stations whose reference lane has been loaded already, as follows.

For instance, when Stations A, B and C have been loaded in the first lane locking switch board 51 and the code signals of Stations A and B are forwarded from the switching gates 513 and 514 respectively, the both comparison circuits 518 and 519 produce high level outputs. These high level outputs are applied through the AND gate 528 to the NOR gate 530 and the NOR gate 530 forwards a low level output to the start switch 45, thereby inhibiting actuation of the start switch.

On the other hand, when the stations whose code signals are forwarded from the switching gates 513 and 514 have already been loaded in the second lane locking switch board 52, the comparison circuits 520 and 521 produce high level outputs which are similarly applied through the AND gate 529 to the NOR gate 530 to serve to inhibit actuation of the start switch 45.

As described above, if the device of this invention is constantly operated during the navigation, the lane and the phase difference possessed by the navigating body will be known at all times through automatic indication and without the need for constant measurement of phase difference as in the prior art.

What is claimed is:

1. A position detecting device for an omega receiving system, comprising means for receiving first and second omega signals from first and second omega transmitting stations and generating first and second synchronized signals of said first and second omega signals, means for frequency-dividing said first and second synchronized signals by a common divisor to produce first and second frequency-divided waves, means for dividing the phase difference between said first and second frequency-divided waves by the period of said omega signals and producing the resultant integral quotient as the lane number and the remainder as the phase difference between said first and second omega signals, and reference lane loading means for shifting in phase said first frequency-divided wave with respect to said second frequecy-divided wave until the phase difference therebetween becomes equal to said phase difference between said omega signals plus a specific length of time corresponding to the reference lane number.

2. A position detecting device, according to claim 1, wherein said device further comprises means for receiving at least a third omega signal from a third omega transmitting station and generating a third synchronized signal of said third omega signal, means for frequency-dividing said third synchronized signal by said common divisor to produce at least a third frequency-divided wave, and means for shifting in phase said third frequency-divided wave with respect to said second frequency-divided wave in accordance with the phase shift of said first frequency-divided wave, thereby conserving the phase difference between said first and third frequency-divided waves.

3. A position detecting device, accoridng to claim 1, wherein said device further comprises means for receiving fourth and fifth omega signals from fourth and fifth omega transmitting stations and generating fourth and fifth synchronized signals of said fourth and fifth omega signals, means for frequency-dividing said fourth and fifth synchronized signals by said common divisor to produce fourth and fifth frequency-divided waves, and said reference lane determining means includes means for detecting coincidence of one of said first and second omega stations with either said fourth or fifth omega station and means for shifting in phase the frequency-divided wave of the other of said first and second omega station with respect to the frequency-divided wave of one of said first and second omega stations until said reference lane loading operation is completed when said coincidence is detected.

4. A position detecting device, according to claim 1, wherein said reference lane loading means comprises means for aligning said first and second frequency-divided waves in the same phase, and means for shifting one of said frequency-divided waves in phase with respect to the other until said reference lane loading operation is completed.

5. A position detecting device, according to claim 1, wherein the phase shift operations are effected by interrupting production of the frequency-divided wave of one of the corresponding pair.

* * * * *